(No Model.)
T. F. CRARY.
FLOUR BIN AND SIFTER.
No. 401,254. Patented Apr. 9, 1889.
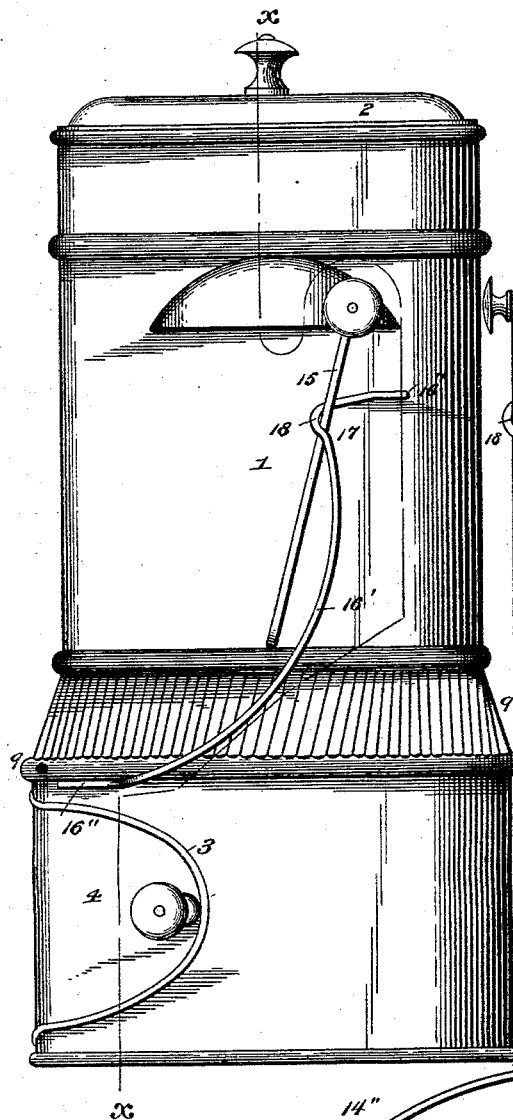
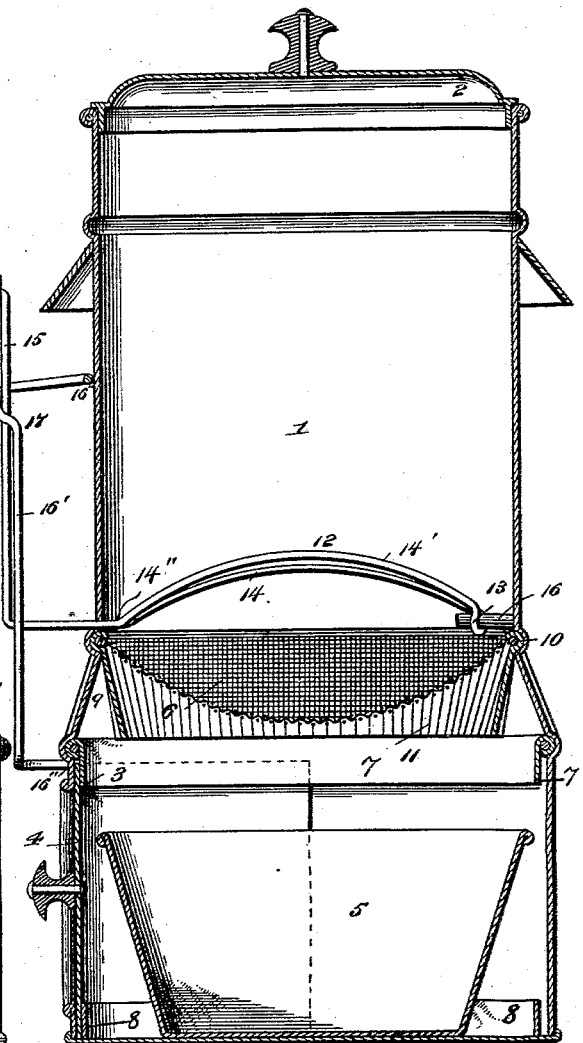
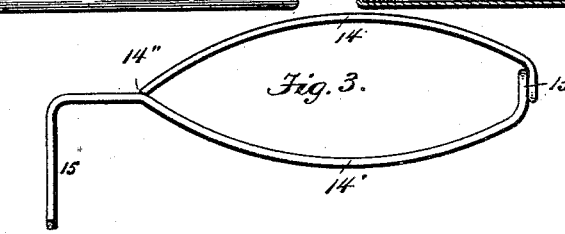
Witnesses:
Inventor:
Thomas F. Crary
By Edson Bros,
Attorneys.

UNITED STATES PATENT OFFICE.

THOMAS FREDERICK CRARY, OF MIDDLEPORT, OHIO.

FLOUR BIN AND SIFTER.

SPECIFICATION forming part of Letters Patent No. 401,254, dated April 9, 1889.

Application filed January 14, 1889. Serial No. 296,339. (No model.)

*To all whom it may concern:*

Be it known that I, THOMAS FREDERICK CRARY, a citizen of the United States, residing at Middleport, in the county of Meigs and State of Ohio, have invented certain new and useful Improvements in Flour Bins and Sifters; and I do hereby declare the following to be a full, clear, and exact description of the invention, such as will enable others skilled in the art to which it appertains to make and use the same.

My invention relates to improvements in flour bins and sifters; and it consists of the peculiar construction and arrangement of parts, as will be hereinafter fully described, and particularly pointed out in the claims.

The object of my invention is to provide a flour bin and sifter with an agitator of simple and durable construction; to provide a guard for limiting the movement of the agitator in both directions and which is constructed to serve as a lock for the agitator when the latter is not in use; to provide means for deflecting the flour after it passes through the sifter into a receptacle, and thus prevent waste of material, and, finally, to construct and secure together the several parts of the bin in a novel manner, and thereby promote simplicity and durability of construction and cheapness of manufacture.

To enable others to understand my invention, I will now proceed to describe the same in connection with the accompanying drawings, in which—

Figure 1 is a side elevation of my improved bin and sifter, showing the handle of the agitator in an elevated position and locked by the guard. Fig. 2 is a vertical sectional view taken on the line *x x* of Fig. 1. Fig. 3 is a detail plan view of the oscillating agitator detached from the bin.

Like numerals of reference denote corresponding parts in all the figures of the drawings.

Referring to the drawings, 1 designates the inclosing shell or case of a flour bin and sifter constructed in accordance with my invention. The shell as shown herein is cylindrical in form; but it may be square or of any other preferred shape. The shell is provided with a removable cover, 2, at its upper open end, and at the base of the shell or case is provided an opening, 3, which is adapted to be closed by a sliding door, 4, when the device is used for sifting flour or other materials. When the shell or case is made cylindrical, the door is made in the segment or arc of a circle, so as to slide compactly within the closed rear side of the case when it is opened to permit access to a receptacle or vessel, 5, placed within the shell to catch or receive the flour after it passes through the sieve 6. In order to prevent lateral displacement of the door, and thus hold the latter in place and guide it when it is adjusted, I have provided two annular guide beads or strips, 7 8, one of which is fixed to the bottom of the shell or case concentric therewith, and the other is secured at one edge (its upper) to the base of a flared or inclined portion, 9, of the exterior shell or case, 1, this flared or inclined portion being formed at an intermediate point of the length of the shell or case immediately above the opening 3 in the lower end thereof and on the plane of the sieve 6.

It will be noted that the guide beads or strips 7 8 are concentric with and out of contact with the exterior shell or case, 1, thus leaving an intermediate concentric groove between each guide-bead and the shell, in which grooves the edges of the sliding door are fitted.

The sieve 6 is made concavo-convex, and to its edge is united an annular strengthening strip or wire, 10, and to this strengthening wire or strip 10 is united the upper edge of a flaring deflector, 11, which is arranged exteriorly of the sieve, the deflector being concentric with the sieve and at the same time arranged at an acute angle thereto, so as to be out of lateral contact with the sieve. The deflector entirely surrounds the sieve and depends below the same, and it is arranged between the sieve and the exterior inclosing shell or case. (See Fig. 2.) In the manufacture of the bin and sifter I prefer to first secure the rim or band 10 to the edge of the sieve, and then unite the upper edge of the deflector to the rim or band, after which the parts are adjusted in the shell or case 1 and all secured thereto by soldering or by any other suitable means. The deflector being arranged below the sieve and between the latter and the shell, and being contracted at its lower open end, serves to effectively direct the flour after it passes through the sieve into the receptacle or tray 5, which can readily be removed through the opening 3.

The agitator 12 is arranged above the sieve within the case or shell, so as to sweep the upper side of the sieve. This agitator is made of a single piece of wire, which is bent upon itself to form an eye or loop, 13, two curved longitudinal arms, 14 14', and a crank-handle, 15. The crank-handle and loop or eye are located at opposite ends of the longitudinal curved arms 14 14' of the agitator, and the crank-handle is passed through a suitable aperture in one side of the shell or case 1 to form the support for one end of the agitator, while in the loop or eye at the opposite end of the agitator is fitted a short trunnion or shaft, 16, which is firmly secured to the shell or case. (See Fig. 2.) The arms 14 14' of the agitator are curved to nearly approximate the concavity of the sieve, so as to sweep close to the same when the agitator is oscillated back and forth, and these arms are spaced laterally of each other, as shown. One end of the wire of which the agitator is formed is extended, as described, to form the crank-handle, while the other end of the wire terminates in the arm 14', which is united to the other arm, 14, by solder or otherwise at the point 14''.

The guard 16' is arranged exteriorly of the shell or case on the side thereof that the crank-handle extends through said case, and this guard is curved longitudinally and secured to the shell in an inclined position, so that the crank-handle will strike the ends of the guard, and thus limit the movement of the agitator to an oscillating one. The ends of the guard are bent inward toward the shell or case at 16'' and secured directly thereto. The main portion of the guard is arranged at a uniform distance from the side of the shell or case to permit the crank-handle of the agitator to swing back and forth within the guard without hinderance therefrom; but at one end of the guard, preferably the upper end, the wire is inclined inwardly, as at 17, and formed into a notch or recess, 18, into which the crank-handle is adapted to be fitted when it is desired to lock said handle in place.

It will be noted that the crank-handle will ride against the inclined part of the fixed guard when it is forced upward, so that it will be moved laterally for a slight distance; but as soon as it enters the recess or notch said handle will spring outward and take or bear against the shoulder of the notch, which will prevent displacement or movement of the handle until it is again clear of the notch, which can be accomplished only by hand.

The operation of my invention is obvious from the foregoing description, taken in connection with the drawings. To use the sifter, the crank-handle is depressed and moved out of its locking notch or recess, and said handle is oscillated back and forth to stir up the contents of the bin and force the same through the sieve, from whence the flour or other material is deflected by the flaring deflector into the receptacle or vessel. It will be understood that the door 4 and cover 2 are closed when the device is used for sifting the flour, and after the flour is sifted the door is opened to remove the vessel or tray.

Having thus fully described my invention, what I claim as new, and desire to secure by Letters Patent, is—

1. In a flour bin and sifter, an oscillating agitator consisting of the curved laterally-spaced arms having an eye or loop at one end and a crank-handle at the opposite end of the arms from said eye or loop, in combination with a shell or case through which the crank-handle is passed to provide a support for one end of said agitator, and a short trunnion or stud fixed to said case and fitted in the eye or loop of said agitator to support the opposite end of the agitator, substantially as described.

2. In a flour bin and sifter, the combination, with a shell or case, a sieve, and an agitator having an extended crank-handle, of a curved guard fixed in an inclined position exteriorly on the case and having one end thereof inclined toward the shell, as described, and a notch or recess contiguous to said inclined end, substantially as described.

In testimony whereof I affix my signature in presence of two witnesses.

THOMAS FREDERICK CRARY.

Witnesses:
C. F. BESSERER,
HOMER MCMASTER.